Nov. 24, 1925.
A. STELL
1,562,924
BEARING FOR THE SPINDLES OF FLIER SPINNING, DOUBLING, TWISTING, AND LIKE MACHINES
Filed April 22, 1925
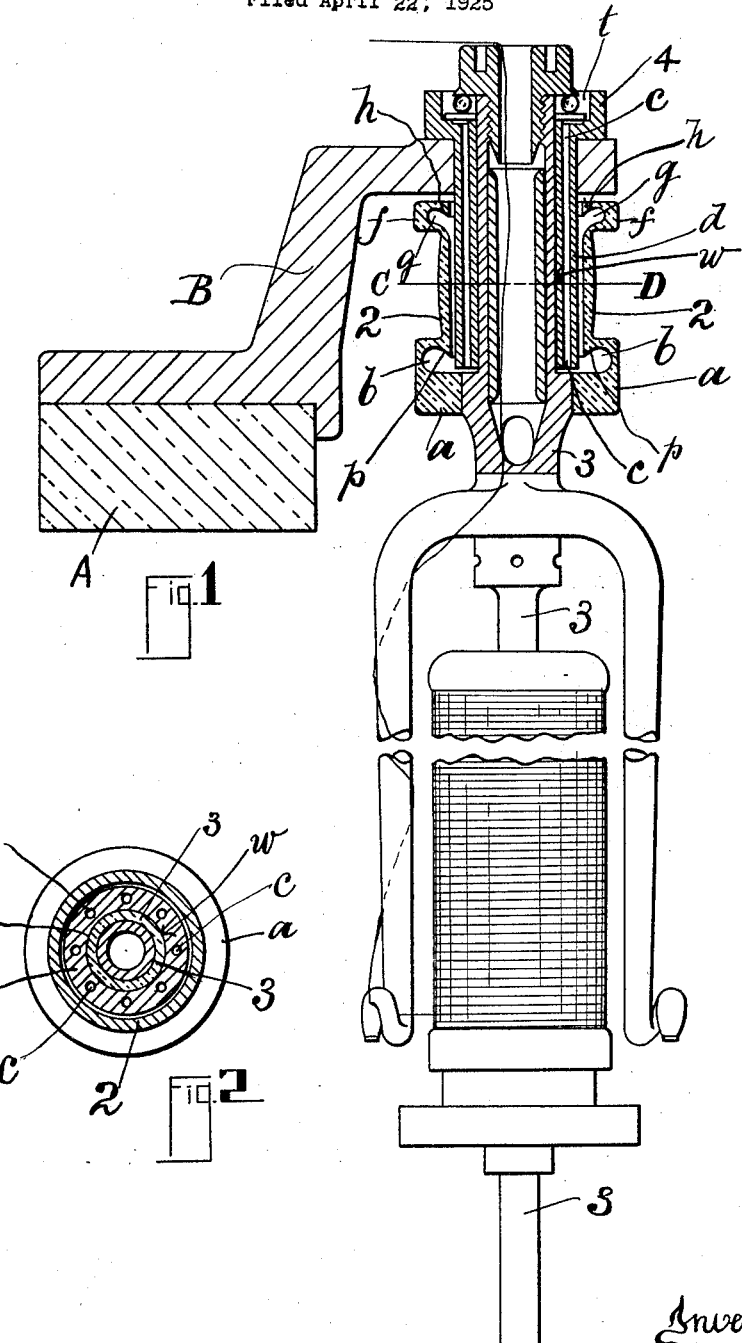

Patented Nov. 24, 1925.

1,562,924

UNITED STATES PATENT OFFICE.

ALFRED STELL, OF KEIGHLEY, ENGLAND.

BEARING FOR THE SPINDLES OF FLIER SPINNING, DOUBLING, TWISTING, AND LIKE MACHINES.

Application filed April 22, 1925. Serial No. 25,076.

*To all whom it may concern:*

Be it known that I, ALFRED STELL, a subject of the King of Great Britain, and resident of The Whins, Ingrow, Keighley, in the county of York, England, have invented a certain new and useful Improvement in Bearings for the Spindles of Flier Spinning, Doubling, Twisting, and like Machines, of which the following description, having reference to the accompanying sheets of drawings, is a specification.

It relates to bearings for the spindles of flier spinning, doubling, twisting and like machines of the class wherein the driving wharle or pulley is situated at the upper end of the spindle and above the flier, and my said invention consists in so constructing the said driving wharle or pulley and the sleeve or bearing which takes into and supports same that I secure better lubrication for a longer period than is possible with bearings as heretofore constructed.

In the accompanying sheet of drawings which illustrate my invention:—

Fig. 1 is a sectional elevation showing a rail A which extends from end to end of the machine and has the supporting brackets B fixed to it in the usual and well known manner, and my improved devices are shown mounted upon said bracket B.

Fig. 2 is a sectional plan, taken on line C. D. of Fig. 1 and show parts hereinafter described.

In accordance with my invention I form the wharle or driving pulley 2 so that it may be fixed upon the upper end of the spindle 3 as heretofore, but within the lower radial flange $a$ on said driving pulley or wharle 2 I now form an annular space or cavity $b$ so that lubricant may be contained within said annular space $b$ to which longitudinal openings $c$ (through the body of the sleeve $d$ of the bearings 4 for the spindle 3) lead to the upper end of said bearing 4.

In the upper radial flange $f$ of the said wharle 2 I also form another annular space $g$ (to contain more lubricant) and the upper wall $h$ of this space is inclined downwardly towards the centre of the spindle 3 so that its upper outer edge is higher than its inner edge. Thus the centrifugal motions of the lubricant tend to cause same to rise to the higher part of this space $g$ and into contact with the inclined surface $h$ so that as it is thereby prevented from flowing inwardly and rising over the flange $f$ because the centrifugal actions on the lubricant cause it to flow down the incline surface $h$ and back down the outer surface of the sleeve $d$ to the lower end of the wharle 2. By these means all liability of any of the lubricant escaping and flowing away from the bearings is avoided. As stated I also form an annular space $b$ in the lower flange $a$ of the wharle 2 so that its upper covering surface $p$ may be inclined towards the spindle 3 as is the surface $h$ and this I find to act as a prevention to the too great a rising of the lubricant within the cavity of the wharle 2.

The sleeve $d$ of the bearing 4 taking within the wharle 2 as above stated, has longitudinal openings $c$ formed within its walls and said sleeve 4 has also a cavity or well $t$ formed at its upper end in order that the lubricant may be supplied to such cavity $t$ so that same may flow down through the openings $c$ to fill the spaces within the wharle 2 as above described.

The lubricating liquid as is well known is caused to flow or percolate between the rotary outer surface $w$ of the spindle 3 and the inner wall of the sleeve $d$ so that on rising from the space within the cavity in the wharle 2 to the upper cavity $t$ in the bearing 4, it then flows down the openings $c$ back to the cavity within the wharle 2, while by the inclined surfaces $h$ and $p$ acting as before described the overflowing or throwing away of the liquid lubricant is prevented.

Such being the nature and object of my said invention what I claim is:—

1. The combination with the spindle of a spinning or similar machine, of a wharle fixed upon the spindle and provided with an interior angular lubricant receiving cavity, the upper surface of which is inclined downward toward the spindle receiving bore, and a relatively stationary supporting sleeve surrounding the spindle and extending into said cavity in the wharle, said sleeve having a recess at its upper end and being provided with a plurality of ducts that extend from said recess through the end of the sleeve within the cavity in the wharle, for the purpose described.

2. The combination with the spindle of a spinning or similar machine, of a wharle fixed upon the spindle and provided adjacent both ends with interior, annular cavities, both communicating with the bore in the wharle and having their upper surfaces inclined downward toward the axis of said bore, and a relatively stationary supporting sleeve surrounding the spindle and extending through the bore in the wharle into the lower cavity in the wharle, said sleeve having a recess at its upper end and being provided with a plurality of ducts that extend from said recess through the end of the sleeve within the wharle, for the purpose described.

ALFRED STELL.